United States Patent Office 2,841,690
Patented July 1, 1958

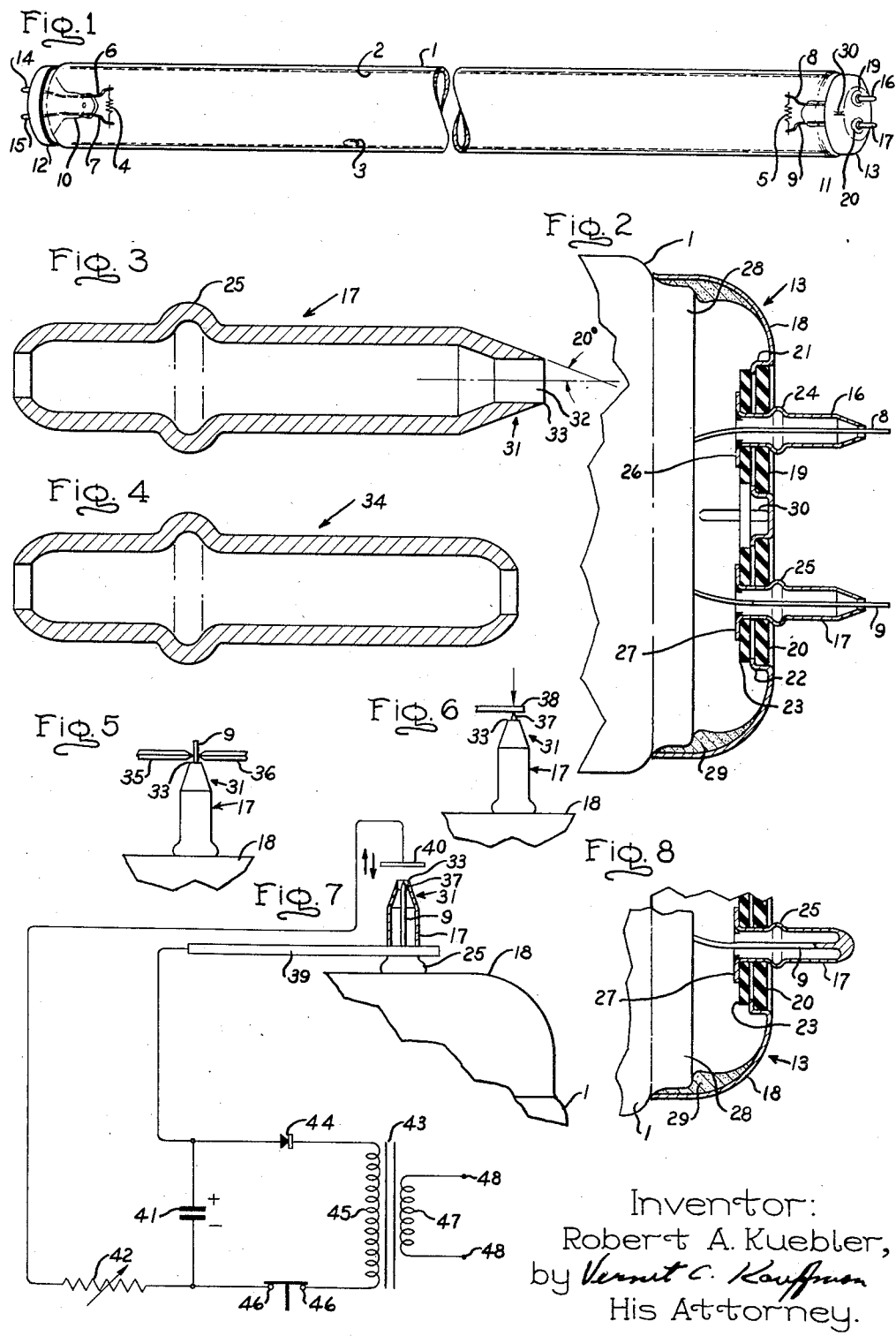
July 1, 1958     R. A. KUEBLER     2,841,690
CONTACT PIN AND METHOD FOR FLUORESCENT LAMPS
Filed Dec. 28, 1954
Inventor:
Robert A. Kuebler,
by Vernet C. Kauffman
His Attorney.

2,841,690

CONTACT PIN AND METHOD FOR FLUORESCENT LAMPS

Robert A. Kuebler, Cleveland Heights, Ohio, assignor to General Electric Company, a corporation of New York Application December 28, 1954, Serial No. 477,970

4 Claims. (Cl. 219—100)

The present invention relates to tubular contact pins for electric devices, such as the bi-pin bases of tubular fluorescent electric discharge lamps, and more particularly the invention relates to such contact pins and to methods for making a welded connection between the contact pins and the inlead wires of electric lamps using pin-type bases.

In the copending application of Warren F. Albrecht, Serial No. 365,429, filed July 1, 1953, now Patent No. 2,749,528, patented June 5, 1956 and assigned to the assignee of the present application, a welded connection between the inlead wire and the tubular pin of an electric lamp base is disclosed and claimed. The connection between the pin and the inlead wire consists solely of the intermingled metals of the wire and the end of the pin and closes the end of the pin.

The principal object of the present invention is to provide a contact pin of new and improved form which facilitates making a welded connection between the pin and the inlead wire.

Another object of the invention is to provide a new and improved method of assembling and welding the pin and the inlead wire for making a welded connection therebetween.

Further objects and advantages of the invention will appear from the following detailed description of species thereof.

A feature of the invention is a tubular contact pin having a tapered nose at the outer end thereof to which an inlead wire threaded through the pin is welded. The nosed end of the pin defines an axial cylindrical restricted opening into the bore of the pin and presents an annular welding edge of low thermal mass.

The novel structure of the pin of the present invention provides a greater mass of metal compared to the size of the opening to be closed by the molten metal during welding than is the case with prior commercial rounded-end pins. The amount of metal made molten during welding of the tapered nose pin is sufficient to completely close the opening in the nose thereof and make a good electrical and physical welded connection between the pin and the end of an inlead wire positioned within the opening and threaded through the pin during assembly.

The new method of assembling and welding the pin and the inlead wire to make a welded connection therebetween comprises the steps of threading the inlead wire through the pin, removing the excess length of the inlead wire extending beyond the outer end of the pin, positioning the remaining end of the inlead wire either flush with or preferably in back of the annular welding edge of the pin and then welding together the nosed end of the pin and the said inlead wire end and also closing the nosed end of the pin by drawing a welding arc at the nosed end of the pin by passing an electric welding current through the pin only and not the inlead wire.

In the drawing accompanying and forming part of this specification:

Fig. 1 is an elevational view of a fluorescent discharge lamp provided at its ends with bases having contact pins embodying the invention;

Fig. 2 is a fragmentary view, partly in section and on an enlarged scale, of one end of the lamp shown in Fig. 1;

Fig. 3 is a sectional elevational view on an enlarged scale of one of the contact pins of the base shown in Figs. 1 and 2 and showing the form of the pin before it is attached to the base and before the inlead wire is welded thereto;

Fig. 4 is a similar view of a contact pin of different form used extensively for fluorescent lamps and is included to illustrate clearly the difference in structure between the prior contact pins and the contact pin of the present invention.

Figs. 5, 6 and 7 illustrate diagrammatically the various steps of the preferred method of the invention followed in making a welded connection between a contact pin attached to the base and an inlead wire extending from the lamp envelope; and Fig. 8 is a fragmentary, partly sectional view of the end of the lamp shown in Fig. 2 and showing the base pin and the inlead wire after the welded connection has been made therebetween by the method illustrated in Figs. 5, 6 and 7.

Like numbers denote like parts in all the figures.

While the contact pin and the method of the present invention have been illustrated in the drawing and described below in connection with a tubular fluorescent gaseous electric discharge lamp, it will be understood that I contemplate that the new contact pin and the method may be used for other electrical devices, such as radio vacuum tubes.

Referring to Fig. 1 of the drawing, the fluorescent lamp illustrated is of a well-known commercial type, many millions of which have been sold under the designation of the rapid start, 40-watt fluorescent lamp.

These lamps comprise an elongated tubular glass envelope 1 having a phosphor coating 2 on its inner surface and containing a starting gas, such as argon, at a pressure of about 3 to 4 millimeters, together with a small amount of mercury, such as the droplet 3, the vapor of which during operation of the lamp is highly emissive of 2537 A. wave length radiations which excite the phosphor coating to visible light emission. A pair of preheatable electron-emissive filamentary electrodes 4 and 5 which include a tungsten filament supporting alkaline-earth oxide material are sealed into opposite ends of the envelope 1. Preheat current is supplied to the electrodes 4 and 5 through a pair of current inlead wires 6 and 7, 8 and 9, respectively, extending through and sealed into the glass re-entrant stems 10 and 11 at opposite ends of the envelope. The starting and operating current for the lamp is also applied between the electrodes 4 and 5 through the said inleads, usually through one inlead of each pair.

The lamp also includes a pair of identical, generally disc-shaped bases 12 and 13, permanently attached to each end of the envelope 1. The inlead wires 6, 7 and 8, 9 (Figs. 1 and 2) extending from opposite ends of the envelope 1 are threaded through and attached to pair of spaced, insulated, tubular pins 14, 15 and 16, 17 mounted on the bases 12 and 13, respectively.

The tapered nose contact pins 16, 17 embodying the invention are shown staked or riveted to the lamp base 13 in Figs. 2 and 8 of the drawing, and in Fig. 8 the appearance of the attached pin 17 is shown after the end of the corresponding inlead wire 9 has been welded thereto by the method of the present invention illustrated in Figs. 5, 6 and 7.

As shown in Figs. 1 and 2, the base 13 comprises a metal shell 18, such as an aluminum shell, having spaced circular openings closed by electrically insulating fiber washers or buttons 19 and 20.

The buttons 19 and 20 are disposed in rabbeted seats formed by the flanged margins 21 and 22 of the disc openings and are held in said seats by an inner annular electrically insulating washer 23 and the contact pins 16 and 17. The contact pins are each provided with an annular shoulder 24 and 25, respectively, which bears against the corresponding button 19 and 20. The inner ends of the pins 16 and 17 are upset against the inner washer 23 as shown at 26 and 27 of Figs. 2 and 8. The pins 16 and 17 are thus securely staked to the base shell 18 and are electrically insulated therefrom and from each other.

The shell 18 of the base 13 is attached to a necked portion 28 of the envelope 1 by a ring 29 of basing cement as shown in Fig. 2. Diametrically opposed strengthening ribs 30 are provided on the shell 18. It will be understood, of course, that the base 12 mounted on the opposite end of the envelope 1 is the same in structure and is attached to the envelope 1 in the same manner.

In mounting the base 13 on the envelope 1 the outer ends of the inlead wires 8 and 9 are threaded through the base pins 16 and 17 and the outer rim of the base shell 18 with the ring 28 of basing cement applied to its inner surface is slipped over the neck 28 of the envelope 1 and forced against the said envelope. The basing cement fills the annular space between the neck 28 and the shell 18 and holds the base 13 and the envelope 1 together after it has been cured and hardened. The base 12 at the opposite end of the lamp may then be attached to the envelope 1 in the same manner.

As shown in Fig. 2, the outer ends of the inlead wires of the lamp envelope extend beyond the ends of the base contact pins after the bases have been attached to the ends of the envelope.

The contact pins 14 and 15, 16 and 17 of the bases 12 and 13 respectively, are identical in structure, and in Fig. 3 the structure thereof before the pins are staked to the base in the manner described above and before the welded connections between the pins and the inlead wires are made in the manner described below is shown embodied in the contact pin 17.

As shown in this figure, the outer end 31 of the generally tubular shaped contact pin 17 is extended and tapered to form a pointed nose, the inner and outer walls of which are frusto-conical in shape, and defines a restricted, axially extending, elongated, cylindrical opening 32 into the bore of the contact pin. The diameter of the cylindrical opening 32 is substantially equal to the diameter of the top of the frusto-conical shaped outer end 31. The pin 17 thus presents a thin annular outer termination or edge 33 of low thermal mass which facilitates welding of the pin 17 to the corresponding inlead wire 9.

The contact pin 34 shown in Fig. 4 of the drawing is of the rounded-end type used extensively heretofore for fluorescent lamps and a comparison of Figs. 3 and 4 shows clearly the differences in the shapes of the two pins. In Figs. 3 and 4 the pins 34 and 17 are drawn to the same scale.

With the exception of the shape of its extended outer end 31 and its consequent more extended length between the collar 25 and its tip edge 33, the pin 17 of Fig. 3 is identical in size and shape and is attached to the lamp base in the same manner as the prior pin 34 shown in Fig. 4.

The first step in attaching the inlead wires to the pins 14 to 17 in accordance with the present invention is to pull the said wires taut to straighten any kinks, turns, or the like. This may be accomplished either manually or mechanically and after release of the pulling force the wires tend to assume the shape and position shown in Fig. 2.

The excess length of the wires 8 and 9 extending beyond the ends of the pins 16 and 17 is then removed after the inleads have been straightened as described above. As shown in Fig. 5 of the drawing, which illustrates this step of the method performed in conjunction with pin 17 and inlead wire 9, the removal of the excess length of the wire is preferably accomplished by cutting the wire as close to the edge 33 of the nosed end 31 of the pin as possible and in such manner that the cut end of the wire is V-shaped. Cutting wheels indicated at 35 and 36 of Fig. 5 are satisfactory for this purpose, although reciprocating cutting shears capable of making a V-shaped cut also are satisfactory.

After the excess length of the inlead wire 9 has been cut off and removed, the V-shaped end 37 of the wire extending beyond the edge 33 of the pin (Fig. 6) is pushed into the pin until the apex of the V-shaped end thereof is flush with or, preferably, is positioned slightly in back of the edge 33 (Fig. 7). This may be accomplished manually but is preferably done mechanically by a reciprocating arm movable in the direction of the arrow from the position shown in Fig. 6.

After the wire end 37 has been so positioned in the pin 17 the welding operation is carried out. In accordance with the present invention, in the welding operation both the electrodes of the welding apparatus engage the pin 17, so that the welding current flows through the pin only and not through the inlead wire.

A suitable welding apparatus is shown diagrammatically in Fig. 7 and comprises a contact member 39 which engages the pin 17 just forward of the shoulder 25. An electrode 40 suitably insulated and mounted for reciprocating movement in the direction of the arrows is positioned above the pin 17 to make contact with the thin annular edge 33 of the latter. The electrode 40 is made considerably larger than the pin 17, so that it has a much greater heat capacity than the pin in order for the condenser discharge produced by the welding apparatus to fuse the end of the lead wire and the tip of the pin together without any substantial effect on the electrode itself. The electrode 40 is provided with a bottom surface adapted to engage the full periphery of the annular edge 33 of the pin 17.

A welding circuit such as that disclosed in the Albrecht patent referred to above and shown schematically in Fig. 7 of the drawing is suitable for producing the welding arc between the electrode 40 and the pin 17. In the circuit of Fig. 7, the positive side of a capacitor 41, which may have a value of approximately 5,000 microfarads, is connected directly to the electrode 39 engaging the pin 17, and the negative side of the capacitor is connected through the rheostat 42, which may be adjustable between zero and 3 ohms, to the reciprocal electrode 40. The capacitor 41 thus starts to discharge immediately on contact of the electrode 40 with the edge 33 of the pin 17 to make a welded connection between the inlead wire 9 and the pin 17 as described below.

In the circuit illustrated, the capacitor 41 is recharged by the step-up transformer 43 and the half-wave rectifier 44 connected in series with the secondary winding 45 of the transformer 43 and a pair of relay contacts 46 across the capacitor 41. The relay contacts 46 are normally closed and may be arranged to open just prior to the discharge of the capacitor 41 in order to prevent short-circuiting of the rectifier 44 and the transformer 43 at the time when the weld is made. The primary winding 47 of the transformer may be connected at its terminals 48 to the usual 115 to 120 volt, 60-cycle commercial supply. The rheostat 42 may be set at about 1.5 ohms and the capacitor 41 may be charged to about 400 volts at the beginning of the welding cycle, I have demonstrated that a welding circuit such as that described above is effective for making a welded connection between the V-shaped end 37 of the inlead wire 9 and the tapered nose 31 of the pin 17 when the circuit components are so proportioned, arranged and dimensioned to draw and establish a welding arc at the nosed end 31 of the contact pin of 100 to 150 amperes for 1/15 to 1/30 of a second; when the part of the inlead wire 9 welded to the pin 17 is of 16 mil diameter copper wire, and when the pin 17 consists of brass and has the following dimensions: an over-all length of about 0.475 inch, an outer diameter of the tubular portion of about 0.090 inch, a bore of about 0.060 inch, and a wall thickness of about 0.015 inch. The length of the tapered nose 31 is about 0.075 inch, the diameter of the cylindrical opening 32 in nose 31 is about 0.042 inch and the slope of the inner and outer walls of the tapered nose 31 with respect to the longitudinal axis of the pin is about 20 degrees.

In contrast, the prior rounded-end pin 34 shown in Fig. 4 has an over-all length of 0.450 inch. The difference in length between the pin 17 of Fig. 3 and the pin 34 of Fig. 4 is in the part of the pins between the annular shoulders and the outer ends thereof. Accordingly, the pin 17 is 0.025 inch longer between the edge 33 and the shoulder 25 thereof than the corresponding part of pin 34.

The welded connection between the pin 17 and the end portion of inlead 9 is formed in the following manner:

Electrode 40 is brought into contact with the thin edge 33 of pin 17 to start discharge of the capacitor 41. The maximum resistance in the condenser circuit, exclusive of the rheostat 42, occurs at the thin edge 33 which, because of its low thermal mass, melts and partly vaporizes almost immediately to break the metallic circuit. The capacitor continues to discharge, however, by an arc discharge through the metal vapor and heat is developed very quickly at the tip of the pin which liquifies and drops back from the electrode 40. In accordance with the disclosure in the Albrecht patent referred to above, the electrode 40 may be mounted to follow the molten metal as it moves backward therefrom, but in such manner that an arcing space is present between the end of the electrode and the molten metal, so that the capacitor continues to discharge through the metal vapor until the capacitor is completely discharged. The molten metal of the pin flows around the V-shaped end 37 of the inlead wire 9 which, due to the low heat capacity of the said V-shaped wire end, quickly becomes molten and intermingles with the molten metal of the pin. The intermingled molten metal of the pin and the wire completely fills and thus closes the cylindrical passage 32 in the nose 31 and on solidifying on cessation of the arc discharge constitutes a welded connection between the pin 17 and the inlead wire 9.

As shown in Fig. 8, which shows the welded connection after the molten metal has solidified, the pin 9 is shortened as a result of the welding. This is due to the molten metal assuming a rounded shape because of its surface tension. I have found that the best results are obtained when the nose 31 of the pin is shortened about half its length, that is, about 0.037 inch, after the welding has been completed and the molten metal has solidified. The length of the pin 17 is then approximately the same as the length of the pins previously used, so that fluorescent lamps equipped with the new contact pins may be used in existing lighting fixtures and lamp holders.

The welded end of the pin is rounded, solid walled, and free from voids and a firm welded joint constituted solely of the intermingled metal of the pin and the inlead wire is formed between the said wire and the said pin.

The method described above is adapted for use with rotary lamp making or finishing machines, such as that disclosed in U. S. Patent 1,708,756—Fagan. Such machines, in general, comprise a turret or turntable on the outer periphery of which the lamps are vertically supported in suitable chucks and means for intermittently rotating the turret while the lamps are stationary at the various stations. The required operations are performed by suitable mechanisms fixed in position around the periphery of the turret and synchronized to operate during the dwell periods thereof.

The various mechanisms disclosed above in connection with Figs. 5 to 7 for carrying out the method of the invention may be mounted in such positions around the turret and at successive stations and synchronized to perform their respective functions during the dwell periods.

The various parts of such a machine may be arranged so that the two contact pins attached to the base at one end of the lamp envelope may be welded, as described above, separately and in sequence, and thereafter the contact pins of the other base at the opposite end of the lamp envelope may be welded, also separately and in sequence.

The position of the pins being welded with respect to the vertical is not critical as the surface tension of the molten metal is sufficiently strong to overcome the effect of gravity thereon even when the pin is directed vertically downward.

While I have shown and described my invention in conjunction with a particular form of base for a fluorescent discharge lamp, it will be understood, of course, that I contemplate that contact pins embodying the invention may be used in conjunction with bases of different structure used for such lamps or other electrical devices and that the contact pins may be attached to such bases or to such devices in other ways and have a different configuration at parts thereof other than the end parts defining the restricted opening 32 and presenting the annular welding edge 33 of low thermal mass.

It will be understood further that I contemplate that changes in the details of the steps of the method may be made without departing from the invention; for example, the excess length of the inlead wire may be removed by snapping, breaking, tearing or cutting it off which may lead a ragged or a plane end surface as distinguished from a V-shaped surface on the end of the wire. Good results may be obtained with wire ends of such shapes though I have found that the best results are obtained with a V-shaped inlead wire end due to the lower heat capacity thereof. When the excess length of the inlead wires is snapped off over the end edges 33 of the pins instead of being cut by a separate means such as that shown in Fig. 5, the broken ends of the inlead wires are retracted to a position in back of the edge 33 of the pins due to the tendency of the remaining portions of the wires to assume the shape shown in Fig. 2. The step of pushing the ends of the wires into the pins shown in Fig. 6 may then be omitted.

Positioning the inlead wire ends in such manner with respect to the contact pins that the said wire ends do not extend beyond the end edges 33 of the pins avoids in a positive manner passing the welding current through the inlead wires. The passage of such current through the wire is harmless when the wire is in direct contact with the pin but such direct contact between the pin and the wire is difficult to assure in all cases in the mass production of lamps on high-speed machines and failure to make such direct contact results in broken inlead wires caused by arcing between the pins and the wires. The method of the present invention obviates this difficulty by engaging the pin by both welding electrodes and by avoiding engaging the pin with one only of said electrodes and the wire alone with the other.

Claims to the contact pin are presented in my divisional application, Serial No. 689,951, filed October 14, 1957.

What I claim as new and desire to secure by Letters Patent of the United States is:

1. The method of making a welded connection between a generally tubular metal contact pin and the end of a metal inlead wire which comprises the steps of providing the contact pin with an extended end portion having an outer termination of low thermal mass and defining an opening of restricted diameter and of greater length than the wall thickness of the portion of the pin defining said opening, threading the wire through the bore of the pin, positioning an end of the wire within the said restricted opening, and in back of said outer termination, pressing an electrode against the said low thermal mass termination of the said end portion of the pin and with said electrode and said termination pressed together discharging a charged capacitor through a circuit including said electrode and the low thermal mass termination of said contact pin to first vaporize metal at said termination and then form an arc between said pin and said electrode through said metal vapor while maintaining a spacing between said electrode and the main portion of said pin no larger than the spacing therebetween when said electrode and the said termination of said pin are in contact to melt metal at the said extended end portion of said pin and cause liquified metal to flow into said restricted opening and around the end of the inlead wire therein to melt metal at said wire end and close the said opening with intermingled metal of the contact pin and the inlead wire, and thereafter interrupting said arc to solidify the welded connection between said pin and said wire.

2. The method of making a welded connection between a generally tubular metal contact pin and the end of a metal inlead wire which comprises the steps of providing the contact pin with an extended end portion having an outer termination of low thermal mass and defining an opening of restricted diameter and of greater length than the wall thickness of the portion of the pin defining said opening, threading the wire through the bore of the pin with an end of said wire extending outward beyond the said opening, removing the excess length of said wire extending outward from said opening, positioning the remaining end of said wire within the said restricted opening, and in back of said outer termination, pressing an electrode against the said low thermal mass termination of the said end portion of the pin and with said electrode and said termination pressed together discharging a charged capacitor through a circuit including said electrode and the low thermal mass termination of said contact pin to first vaporize metal at said termination and then form an arc between said pin and said electrode through said metal vapor while maintaining a spacing between said electrode and the main portion of said pin no larger than the spacing therebetween when said electrode and the said termination of said pin are in contact to melt metal at the said extended end portion of said pin and cause liquified metal to flow into said restricted opening and around the end of the inlead wire therein to melt metal at said wire end and close the said opening with intermingled metal of the contact pin and the inlead wire, and thereafter interrupting said arc to solidify the welded connection between said pin and said wire.

3. The method of making a welded connection between a generally tubular metal contact pin and the end of a metal inlead wire which comprises the steps of providing the contact pin with an extended end portion having an outer termination of low thermal mass and defining an opening of restricted diameter and of greater length than the wall thickness of the portion of the pin defining said opening, threading the wire through the bore of the pin, with an end of said wire extending outward beyond the said opening, cutting said wire in a V-shape adjacent the said outer termination of the pin, positioning the remaining V-shaped end of the wire within the said restricted opening, and in back of said outer termination, pressing an electrode against the said low thermal mass termination of the said end portion of the pin and with said electrode and said termination pressed together discharging a charged capacitor through a circuit including said electrode and the low thermal mass termination of said contact pin to first vaporize metal at said termination and then form an arc between said pin and said electrode through said metal vapor while maintaining a spacing between said electrode and the main portion of said pin no larger than the spacing therebetween when said electrode and the said termination of said pin are in contact to melt metal at the said extended end portion of said pin and cause liquified metal to flow into said restricted opening and around the end of the inlead wire therein to melt metal at said wire end and close the said opening with intermingled metal of the contact pin and the inlead wire, and thereafter interrupting said arc to solidify the welded connection between said pin and said wire.

4. The method of making a welded connection between a generally tubular metal contact pin and the end of a metal inlead wire which comprises the steps of providing the contact pin with an extended end portion having an outer termination of low thermal mass and defining an opening of restricted diameter and of greater length than the wall thickness of the portion of the pin defining said opening, threading the wire through the bore of the pin, with an end of said wire extending outward beyond the said opening, removing the said excess length of said wire extending outward beyond said opening by snapping off the said excess wire length over the said outer termination of low thermal mass to cause the remaining end of said wire to retract into said pin and to a position within the said restricted opening, and in back of said outer termination, pressing an electrode against the said low thermal mass termination of the said end portion of the pin and with said electrode and said termination pressed together discharging a charged capacitor through a circuit including said electrode and the low thermal mass termination of said contact pin to first vaporize metal at said termination and then form an arc between said pin and said electrode through said metal vapor while maintaining a spacing between said electrode and the main portion of said pin no larger than the spacing therebetween when said electrode and the said termination of said pin are in contact to melt metal at the said extended end portion of said pin and cause liquefied metal to flow into said restricted opening and around the end of the inlead wire therein to melt metal at said wire end and close the said opening with intermingled metal of the contact pin and the inlead wire, and thereafter interrupting said arc to solidify the welded connection between said pin and said wire.

References Cited in the file of this patent

UNITED STATES PATENTS

| | | |
|---|---|---|
| 1,657,208 | Greaves | Jan. 24, 1928 |
| 1,878,212 | Walker | Sept. 20, 1932 |
| 1,970,715 | Tate | Aug. 21, 1934 |
| 2,200,954 | Glassberg | May 14, 1940 |
| 2,279,316 | Herzog | Apr. 14, 1942 |
| 2,293,455 | Desch et al. | Aug. 18, 1942 |
| 2,434,043 | Kershaw | Jan. 6, 1948 |
| 2,438,075 | Smith | Mar. 16, 1948 |
| 2,522,062 | Roovers | Sept. 12, 1950 |
| 2,680,236 | Kuebler | June 1, 1954 |
| 2,749,528 | Albrecht | June 5, 1956 |

FOREIGN PATENTS

| | | |
|---|---|---|
| 589,627 | Germany | Dec. 11, 1933 |